(12) United States Patent
Carlsson et al.

(10) Patent No.: US 9,307,195 B2
(45) Date of Patent: Apr. 5, 2016

(54) CONTROLLING RESOLUTION OF ENCODED VIDEO

(71) Applicant: Microsoft Technology Licensing, LLC, Redmond, WA (US)

(72) Inventors: Pontus Carlsson, Bromma (SE); Magnus Hemmendorff, Stockholm (SE); Konrad Hofbauer, Stockholm (SE); Sergei Nikiforov, Stockholm (SE); David Yuheng Zhao, Enebyberg (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 14/184,228

(22) Filed: Feb. 19, 2014

(65) Prior Publication Data

US 2015/0109406 A1   Apr. 23, 2015

(30) Foreign Application Priority Data

Oct. 22, 2013 (GB) .................................. 1318658.0

(51) Int. Cl.
*H04N 7/14* (2006.01)
*H04N 19/46* (2014.01)
(Continued)

(52) U.S. Cl.
CPC ............. *H04N 7/147* (2013.01); *H04N 19/132* (2014.11); *H04N 19/164* (2014.11);
(Continued)

(58) Field of Classification Search
CPC ............ G01S 5/0072; H04M 1/72572; H04M 2201/40; H04M 2250/52; H04M 3/4936; H04M 3/5191; H04N 19/132; H04N 19/164; H04N 19/167; H04N 19/46; H04N 19/59; H04N 19/63; H04N 19/85; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04W 4/18; H04W 4/185

USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270
See application file for complete search history.

(56) References Cited

U.S. PATENT DOCUMENTS 6,668,018 B2   12/2003   Pearlstein et al.
7,379,496 B2   5/2008   Holcomb et al.
(Continued)

FOREIGN PATENT DOCUMENTS

EP   2523145   11/2012
GB   2447245   9/2008
(Continued)

OTHER PUBLICATIONS

"International Search Report and Written Opinion", Application No. PCT/US2014/060559, Jan. 13, 2015, 13 Pages.
(Continued)

*Primary Examiner* — Khai N Nguyen
(74) *Attorney, Agent, or Firm* — Danielle Johnston-Holmes; Micky Minhas

(57) ABSTRACT

A user terminal for participating in video calls comprises: an encoder having a frame size, being the size in pixels at which it encodes frames of video; and a pre-processing stage which supplies a sequence of frames to the encoder at that frame size, each frame comprising at least an image region representing a source video image at a respective moment in time. The pre-processing stage is configured to supply at least some of the frames to the encoder in a modified form, by resizing the source video image to produce the image region of each modified frame with a size smaller than the frame size of the encoder, and combining with a border region such that the modified frame matches the frame size of the encoder. The encoder encodes the frames at the frame size and transmits them to a receiving terminal as part of a live video call.

20 Claims, 2 Drawing Sheets

(51) Int. Cl.

| | | |
|---|---|---|
| *H04N 19/132* | (2014.01) | |
| *H04N 19/164* | (2014.01) | |
| *H04N 19/167* | (2014.01) | |
| *H04N 19/85* | (2014.01) | |
| *H04N 19/59* | (2014.01) | |
| *H04N 19/63* | (2014.01) | |

(52) U.S. Cl.
CPC ............ *H04N 19/167* (2014.11); *H04N 19/46* (2014.11); *H04N 19/59* (2014.11); *H04N 19/63* (2014.11); *H04N 19/85* (2014.11)

(56) References Cited

U.S. PATENT DOCUMENTS

| | | | |
|---|---|---|---|
| 7,715,475 | B1 | 5/2010 | Puri et al. |
| 8,265,392 | B2 | 9/2012 | Wang et al. |
| 8,270,473 | B2 | 9/2012 | Chen et al. |
| 8,442,120 | B2 | 5/2013 | Hong et al. |
| 8,594,467 | B2 | 11/2013 | Lu et al. |
| 2006/0204113 | A1 | 9/2006 | Wang et al. |
| 2006/0238445 | A1 | 10/2006 | Wang et al. |
| 2008/0129844 | A1 | 6/2008 | Cusack et al. |
| 2008/0152245 | A1 | 6/2008 | El-Maleh et al. |
| 2008/0225945 | A1* | 9/2008 | Wu et al. ............. 375/240.03 |
| 2008/0252495 | A1* | 10/2008 | Mitchell et al. ............. 341/60 |
| 2009/0015658 | A1* | 1/2009 | Enstad et al. ............ 348/14.08 |
| 2009/0244256 | A1* | 10/2009 | Wheatley et al. ......... 348/14.08 |
| 2010/0054620 | A1* | 3/2010 | Kobayashi ................. 382/256 |
| 2011/0193978 | A1 | 8/2011 | Wu et al. |
| 2011/0243470 | A1 | 10/2011 | Noguchi |
| 2011/0249073 | A1* | 10/2011 | Cranfill et al. ............ 348/14.02 |
| 2011/0299605 | A1* | 12/2011 | Price et al. ............... 375/240.26 |
| 2012/0170659 | A1 | 7/2012 | Chaudhury et al. |
| 2013/0235221 | A1* | 9/2013 | Zhou ........................ 348/208.6 |
| 2014/0036103 | A1* | 2/2014 | Kuzdeba et al. ........... 348/222.1 |
| 2014/0211858 | A1 | 7/2014 | Zhao |

FOREIGN PATENT DOCUMENTS

| | | |
|---|---|---|
| JP | 2006262390 | 9/2006 |
| WO | WO-03036985 | 5/2003 |
| WO | WO-2009097449 | 8/2009 |
| WO | WO-2010141023 | 12/2010 |
| WO | WO-2012139275 | 10/2012 |

OTHER PUBLICATIONS

"Search Report", GB Application No. 1301442.8, Jul. 11, 2014, 3 pages.

"International Search Report and Written Opinion", Application No. PCT/US2014/013088, Apr. 7, 2014, 11 pages.

"Self-Adaptive Video Resolution and Aspect Ratio to Record Skype Video Calls", Retrieved from: <http://www.evaer.com/blog/tag/record-skype-video-calls/> on Aug. 23, 2013, Aug. 9, 2013, 3 pages.

Carlsson, et al., "Spatially Adaptive Video Coding", GB Patent Application No. 1301442.8, Jan. 28, 2013, 21 pages.

Liu, et al., "Adaptive Background Skipping Algorithm for Region-of-Interest Scalable Video Coding", In 11th IEEE Singapore International Conference on Communication Systems, Nov. 19, 2008, pp. 788-792.

Lou, "Video Frames Interpolation Using Adaptive", A Dissertation Submitted to the Faculty of Purdue University, Dec. 2010, 122 pages.

"International Preliminary Report on Patentability", Application No. PCT/US2014/013088, Apr. 5, 2015, 8 pages.

"Non-Final Office Action", U.S. Appl. No. 13/804,038, Jul. 1, 2015, 16 pages.

"Second Written Opinion", Application No. PCT/US2014/013088, Jan. 22, 2015, 7 pages.

"Second Written Opinion", Application No. PCT/US2014/060559, Sep. 24, 2015, 8 pages.

"Final Office Action", Application No. 13/804,038, Feb. 01, 2016, 17 pages.

"International Preliminary Report on Patentability", Application No. PCT/US2014/060559, Jan. 13, 2016, 9 pages.

\* cited by examiner

Source frame F        Frame F' to be encoded

Source frame F        Frame F' to be encoded

Frames as encoded at encoder side

Frames as rendered at decoder side

CONTROLLING RESOLUTION OF ENCODED VIDEO

RELATED APPLICATIONS

This application claims priority under 35 USC §119 or §365 to Great Britain Patent Application No. 1318658.0 entitled "Controlling Resolution of Encoded Video" filed Oct. 22, 2013 by Carlsson et al., the disclosure of which is incorporate in its entirety.

BACKGROUND

In modern communications systems a video call may be conducted over a medium such as a wired and/or wireless network, for instance which may comprise a packet-based network such as the Internet. The call comprises at least one video stream being transmitted from one user terminal to another, and often a video stream in both directions. The two terminals establish a communication channel between one another over the network or other medium, allowing frames of video data captured by a camera at the transmit side to be transmitted to the receive side over the channel. The frames of the video are typically encoded by an encoder on the transmitting terminal in order to compress them for transmission over the channel. A corresponding decoder at the receiving terminal decodes the frames of the received video in order to decompress them for output to a screen. A generic term that may be used to refer to an encoder and/or decoder is a codec.

The encoding commonly comprises prediction coding in the form of intra-frame prediction coding, inter-frame prediction coding, or more usually a combination of the two (e.g. an occasional intra-frame encoded "key" frames interleaved between sequences of inter-frame encoded frames). According to intra-frame encoding, blocks are encoded relative to other blocks in the same frame. In this case a target block is encoded in terms of a difference (the residual) between that block and another block in the same frame, e.g. a neighbouring block. The residual is smaller than an absolute value and so requires fewer bits to encode, and the smaller the residual the fewer bits are incurred in the encoding. According to inter-frame encoding, blocks in the target frame are encoded relative to corresponding portions in a preceding frame, typically based on motion prediction. In this case a target block is encoded in terms of a motion vector identifying an offset between the block and the corresponding portion from which it is to be predicted, and a difference (the residual) between the block and the corresponding portion from which it is predicted. Inter-frame encoding usually results in an even smaller residual than intra-frame encoding, and hence incurs even fewer bits.

A video call is by its nature a "live" communication. That is, an outgoing video stream of the call continues to be captured in real-time at the transmitted terminal even while other, previously-encoded data of that same stream is received and played out at the receiving terminal (as opposed to a whole video file being encoded in one go and then subsequently transmitted). "Live" or "real-time" as used herein do not necessarily limit to zero delay. Nonetheless, the user does expect the video to be encoded, transmitted and decoded (on average) at least as quickly as the event being captured actually occurs, and at least as quickly as the video is intended to play out.

When considering video coding, particularly in real-time applications, one issue is the resolution of the video. The term resolution as used herein refers to the pixel resolution, i.e. the size of a frame or image in terms of number of pixels in two dimensions (as opposed to resolution in the sense of pixels per unit area). The pixel resolution is typically expressed in terms of a number of a number of pixels wide and high, i.e. number of columns and rows, e.g. 1280×720 (720p) or 640×480 (VGA). A lower resolution frame will be perceived as worse quality by the receiving user. On the other hand, a higher resolution frame incurs a higher bitrate in the encoded bitstream (and therefore more bandwidth). It also incurs more processing resource to encode (e.g. more processor cycles and/or memory resources), and more processing resource to decode. This means that sending a higher resolution frame than the transmitting terminal, channel or receiving terminal can handle in real-time is liable to result in other issues such as delay or packet loss.

The resolution at which a frame is encoded is an intrinsic property of the encoder. In order to accommodate for factors such as the capacity of the network or processing power of a user terminal, conventional codecs such as those based on the H.264 and HEVC standards allow the encoder to be set to operate at one a plurality of different discrete resolutions, e.g. a 1280×720 (720p) or 640×480 (VGA). The resolution is signalled to the decoder as side information in the bitstream so that the frame can be decoded accordingly.

SUMMARY

It would be desirable to provide a mechanism allowing a desired resolution to be applied in a live video call. For example, it may be desirable to dynamically adapt the resolution in response to one or more changing channel conditions experienced between the transmitting and receiving terminals, and/or the changing availability of one or more processing resources of the transmitting and/or receiving terminals. However, there are various reasons why switching the intrinsic frame size of the encoder may not be desired in any given application or circumstance. For example, this would require a new intra frame (i.e. key frame) to be encoded and transmitted every time the resolution changes, which may affect efficiency in terms of bitrate and/or processing resource. As another example, not all encoders are equipped with the ability to switch frame size (e.g. in the case of a dedicated hardware encoder), and not all decoders are configured to recognise a selectable frame size. Further, suddenly making large jumps between discrete frame sizes like 720p and VGA can have an unpredicted impact on performance, e.g. depending on the camera and/or the content of the video. To address any of these or other issues, it would be desirable to provide an alternative mechanism which does not rely (or does not exclusively rely) on switching between different encoder frame sizes.

According to one aspect disclosed herein, there is provided a user terminal for participating in video calls. The user terminal comprises an encoder having a frame size, which is the size in pixels at which the encoder encodes frames of video. The user terminal also comprises a pre-processing stage which supplies a sequence of frames to the encoder at said frame size. Each frame comprises at least an image region representing a source video image at a respective moment in time. Further, the pre-processing stage is configured to supply at least some of said frames to the encoder in a modified form. To generate each of the modified frames, the pre-processing module resizes the source video image so that the corresponding image region in the respective modified frame is smaller than the frame size of the encoder. To make sure the modified frame still matches the frame size of the encoder, the pre-processing module combines this undersized image region with a border region.

For example, in embodiments the modification may comprise scaling down the source video image and adding a border region, and/or cropping the source video image and including a border region in place of the cropped material.

The encoder encodes each of the frames at said frame size, including the modified frames, and transmits the encoded frames to a receiving terminal as part of a live video call.

In embodiments, the transmitting user terminal is also configured to signal information on said resizing to the receiving terminal, for use in scaling up the image region of the modified frames for display by the receiving terminal Hence according to a further aspect disclosed herein, there is provided a user terminal comprising a decoder configured to decode each of the frames, and a renderer configured to render the image region of each decoded frame at said frame size. The render comprises a resizing stage which receives the information on the resizing performed by the pre-processing stage. Based on this information, the renderer is able to scale the image region of each modified frame up to said frame size, discarding the border region.

Alternatively, if the transmitting terminal does not signal the information on the resizing, or the renderer is a legacy version not equipped to recognise such a resizing technique, then the renderer may simply display the modified frame without resizing the actual image region back to the frame size. In this case the border is displayed to the receiving user, with the image appearing smaller but still viewable.

According to the above techniques, the region of actual, current video content to be encoded is scaled down or cropped to be smaller than the encoder frame size, and a redundant border is added or left behind. This reduces the "effective" resolution for a given frame size of the encoder. The border region is designed to incur relatively few bits in the encoding, at least compared to encoding the same image at the full size of the frame. Hence the border region may contain very little or no difference from one frame to another, and/or may have a substantially uniform colour and brightness within a given frame. In embodiments the border may be uniform black (represented by all zeros in most codecs), or another uniform colour (still incurring no differences across the border region or between adjacent frames having the same border). The border region may comprise substantially no meaningful or perceptible image. This way if there is a chance the renderer at the receive side will display the modified frame without scaling the image region back up and discarding the border (e.g. in the legacy case), then the border will still appear relatively unobtrusive. Alternatively the border need not necessarily be black or uniform. If it will not be displayed at the receive side, it may be beneficial to include in the border region whatever data costs fewest bits. E.g. in case of panning motion, where the same motion vector applies to the whole frame, then minimising the prediction residual will result in image data from the previous frame being placed in the "black border"—unless additional bits are spent to make it black.

Either way, the encoder does not necessarily have to "know" that the modified frames are modified or treat them any differently than unmodified frames—they will simply be encoded as normal, with all the modification having been performed in the pre-processing stage. However, as the border region incurs hardly any bits in the encoding, this means the "effective" resolution can be reduced independently of the encoder frame size. For example, the effective resolution (image size) may be adapted while the encoder frame size may remain constant over a plurality of frames.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in relation to the Background.

BRIEF DESCRIPTION OF THE DRAWINGS

For a better understanding of the described embodiments and to show how it may be put into effect, reference is made by way of example to the accompanying drawings in which.

DETAILED DESCRIPTION

Figure 1:
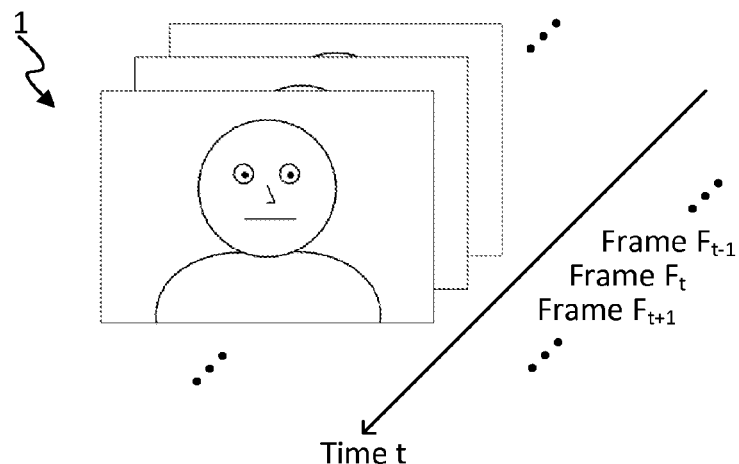
FIG. 1 is a schematic representation of a source video image comprising a sequence of source video frames.

The best pixel resolution to use in a video call generally depends on the channel conditions and on available processing resources. For example the channel conditions may comprise the bitrate capability of the channel, which may be limited by the available uplink bandwidth of the transmitting terminal, available downlink bandwidth of the receiving terminal, and/or available bandwidth over the network (e.g. being limited due to network congestion). Limitations on processing resources may include availability of scheduled CPU cycles and/or availability of storage resources such as registers or RAM, at the transmitting terminal and indeed potentially at the receiving terminal as well. Such limitations may mean that the system cannot practically support a higher resolution video between the transmitting and receiving terminals, at least not without experiencing issues such as data loss or a visible jerkiness or delay in the video. Further, both processing and bitrate capabilities may vary dynamically, so the best pixel resolution to use may not remain constant over a call.

Currently a client application may support a fixed set of discrete resolutions, e.g. 1280×720 (720p) and 640×480 (VGA), and may be configured to switch between them in dependence on bitrate capability or CPU resources. However, the difference between these resolutions is rather large and switching resolution may have an unpredictable, potentially significant impact on the system. For example different cameras may consume different amounts of CPU resource at 720p. It may happen that the transmitting application is forced to switch back down to VGA from 720p as it determines the CPU cannot handle the higher resolution after only just having switched up. Given the large range of different hardware supported, it is difficult to model how all combinations of hardware will behave. A similar issue may occur in relation to bitrate. Depending on content, it may not always be possible to encode at 720p while maintaining an acceptable quality. However, this may not become apparent until after the transmitting application has already predicted that it could when encoding at VGA and made the switch. Hence the transmitting application may find itself having to switch straight back from 720p to VGA after only just having switched up.

It would be desirable to provide a mechanism allowing more fine-grained resolution change (e.g. to change width and height in 5% steps), or which is not bound to only a predetermined, discrete set of resolution modes of the encoder. For example, this may be used to address issues with CPU performance prediction and quality prediction after a resolution change. By making the change in resolution much less drastic, any performance prediction error would have a much smaller impact. It is also less problematic to switch back if the transmitting application subsequently determines it took the wrong decision.

The issue of camera reinitialization may be addressed by fixing the camera capture resolution at a maximum anticipated resolution (e.g. 720p) and then supporting any lower resolution by means of downscaling. A straightforward approach would then be to vary the resolution of the encoder in a continuous manner, signalling the resolution in the bitstream. However, current standards such as H.264 and HEVC would require a new intra frame (key frame) every time a new resolution was signalled at each gradated step of the variation, resulting in a low coding efficiency.

Embodiments disclosed herein provide an alternative approach, by keeping constant the resolution at which the video is encoded and transmitted, and instead adding a black border to the downscaled image. If the resolution of the actual image region is changed in small steps, temporal prediction gain will generally remain fairly high. Thus this approach may be used to allow smoother resolution change, providing a more fluid overall video experience. It may avoid excessive resolution switching back and forth in large steps between discrete encoder resolutions, which may otherwise result in flicker and bitrate inefficiency; or obviate the need for complex implementation logic to avoid this.

Further, the approach can be implemented in compliance with existing standards such as H.264 and HEVC. It is also compatible with legacy encoders and decoders which do not themselves support a variable resolution, or with hardware encoders (as long as there is write-access to input frames) and decoders.

Some example embodiments will now be described in more detail with reference to FIGS. 1 to 6.

FIG. 1 illustrates a source video image 1 comprising a sequence of source frames ( . . . $Ft_{t-1}$, $F_t$, $F_{t+1}$, . . . ), each representing the source video image at a different perspective moment in time ( . . . t−1, t, t+1 . . . ).

Figure 2:
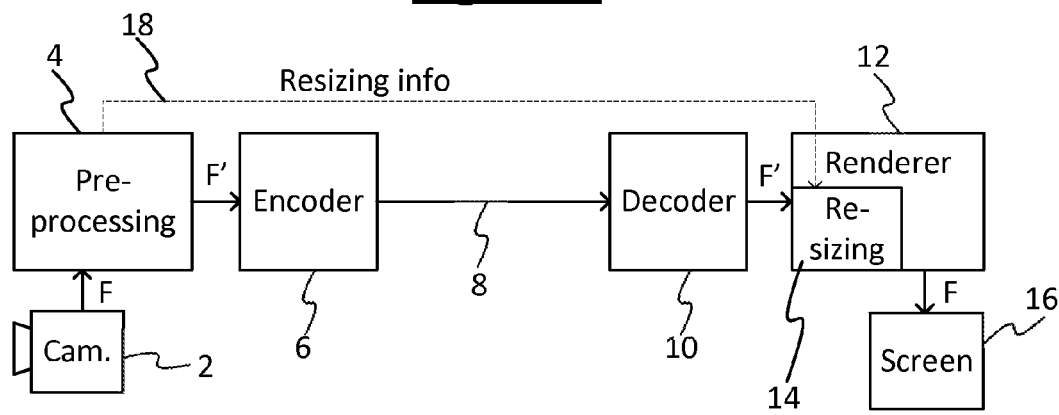
FIG. 2 is a schematic block diagram of a communication system comprising encoder and decoder side elements.

FIG. 2 shows a communication system comprising an encoder side and decoder side apparatus. The encoder side apparatus comprises a video camera 2, a pre-processing stage 4 having an input coupled to an output of the camera 2, and an encoder 6 having an input coupled to an output of the pre-processing stage 4. The decoder side apparatus comprises a decoder 10, a renderer 12 having an input coupled to an output of the decoder 10, and a screen 16 having an input coupled to an output of the renderer 12.

The encoder side apparatus 2, 4, 6 is implemented at a first user terminal such as a desktop or laptop computer, tablet, smart phone, television or a set-top box. The pre-processing stage 4 and encoder 6 may be implemented in software stored on one or more storage media of the first user terminal and arranged to be executed on a processor comprising one or more processing units of the first user terminal. Alternatively, it is not excluded that some or all of the pre-processing stage 4 and or encoder 6 could be implemented in a dedicated hardware circuitry, or configurable or reconfigurable circuitry such as a PGA or FPGA. The camera 2 may be internal or external to the first user terminal. In embodiments, the block labelled 2 may also represent some driver software of the camera 2 or other software associated with the camera 2, which may be implemented in storage of the first terminal or camera 2 and arranged for execution on a processor of the first terminal or camera 2.

The decode side apparatus 10, 12, 16 may be implemented at a second user terminal which again may be for example a desktop or laptop computer, table, smartphone, television or set-top box. The decoder 10 and renderer 12 may be implemented in the form of a software stored on one or more storage media of the second terminal and arranged for execution on a processor comprising one or more processing units of the second terminal. Alternatively, it is again not excluded that some or all of the decoder 10 or renderer 12 could be implemented in dedicated hardware circuitry or configurable or reconfigurable circuitry such as a PGA or FPGA. The screen 16 may be internal or external to the second user terminal. In embodiments, the block labelled 16 may also represent some driver software of the screen 16 or other software associated with the screen 16, which may be implemented in storage of the second terminal or screen 16 and arranged for execution on a processor of the second terminal or screen 16.

The encode side apparatus 2, 4, 6 is arranged to encode and transmit a bitstream 8 of encoded video to the decode side apparatus 10, 12, 16 as part of a live video call between a user of the first terminal and a user of the second terminal. Of course, to allow a bidirectional video call, the second terminal may also comprise its own instance of the encode side apparatus for encoding and transmitting a further bitstream of the call to an instance of the decode side of the apparatus to the first terminal. However, for the sake of illustration, the following will be described from the perspective of the first user terminal transmitting a video bitstream 8 to the second terminal. It will be appreciated that this does not exclude a reciprocal video bitstream in the other direction, which in embodiments may also be handled in a similar manner as disclosed herein.

The camera 2 at the encode side is arranged to capture the source video image 1 from its surroundings. Typically in the case of a video call, a source video image 1 comprises an image of the user of the first user terminal, usually his or her face or face and upper torso (a "talking head"). The camera 2 is configured to output each frame F ($Ft_{t-1}$, F, $F_t$, $F_{t+1}$ etc.) of the source video 1 at a certain source resolution. This is the size of the source frames in terms of the number of pixels in the horizontal and vertical dimensions, e.g. 1280×720 in the case of the 720p format. The camera 2 is arranged to output each of the sequence of source frames F to the pre-processing module 4 at the source resolution. Note that the term "source" does not necessarily imply the resolution at which the image was originally captured by the camera's image capture element. Many modern cameras are designed to capture images at a much higher resolution than is required for most practical purposes, and in embodiments, the frames captured by the camera 2 may be subject to a preliminary quantisation to reduce down from the intrinsic resolution of the image capture element to the source resolution. For example, the driver software or other software associated with the camera 2 may be initialised to output the source frames at a certain source resolution. This may be set to the maximum resolution at which it is anticipated may be desired for the call, e.g. 720p.

The pre-processing module 4 is arranged to receive each of the source frames F from the camera 2 and to apply a pre-processing operation in accordance with embodiments disclosed herein. As will be discussed in more detail shortly with reference to the examples of FIGS. 4 to 6, the pre-processing operation comprises at least two steps. The first is to reduce the video image received in the source frame F from the source resolution to a desired lower resolution (if the source frame has already been quantised down from the original resolution of the image capture element, this will be a further downsizing). For example, this may comprise scaling down and/or cropping the source frame F. This results in a downsized, lower resolution image 24 which is smaller than the size of the source video frames F, and which is also smaller than the frame size used by the encoder 6. For example, the encoder 6 may be configured to encode at the same frame size as the source frames are generated, e.g. 720p, though this is not necessarily the case. The pre-processing stage 4 is configured to then to combine the reduced size, lower resolution image 24 with a border region 26 in order to produce a modified frame F' that has the same frame size as the encoder 6. As will be discussed in more detail shortly, the border region 26 is designed so that when encoded through the encoder 6 it will incur relatively few bits. For example, the border may be a black border, or may consist of an image identical to a corresponding region in a previously encoded frame.

The encoder 6 is arranged to encode each of the modified frames F' at the intrinsic frame size of the encoder 6. The encoder 6 does not need to be configured with any special knowledge of the resizing or the border region 26, and does not necessarily need to be any special kind of encoder. In embodiments, the encoder 6 could be a standard H.264 or HEVC encoder, or could even be a hardware encoder. The encoder 6 encodes each of the modified frames F' at the encoder frame size as if it was any other frame, and does not treat it any differently than it would a frame comprising a captured image that happened to have dark or static edge regions. Thus the encoder 6 will encode the modified frame for including the border region 26 using whatever encoding mode it would have naturally selected for any image having such properties. This may comprise selecting an intra- or inter-coding mode to encode some or all of the blocks of the border region 26 using the intra- or inter-prediction coding. Following any further encoding stages, such as entropy coding, the encoder 6 outputs the encoded version of the modified frame F' to be transmitted as part of the encoded bitstream 8.

The encoded bitstream 8 is transmitted over a channel to the decoder 10 on the second user terminal. For example, the encoded bitstream may be transmitted over a channel established via a communication network such as a packet based network, e.g. the Internet in the case of a VoIP call.

Figure 3:
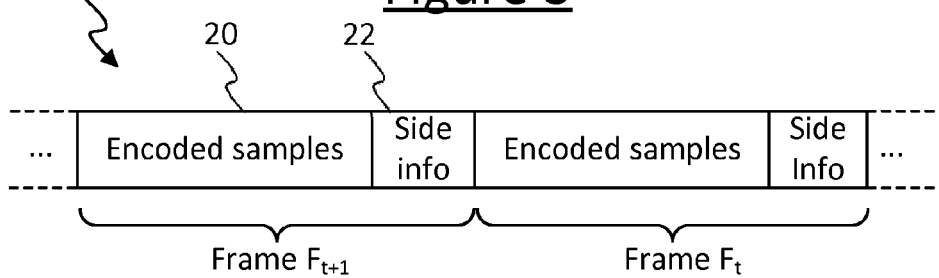
FIG. 3 is a schematic representation of an encoded bitstream as may be transmitted over a communication medium such as a network.

FIG. 3 illustrates an encoded video bitstream 8 as may be transmitted from the encoder 6 over the channel to the decoder 10. The encoded bitstream 8 comprises the encoded samples 20 for each frame, comprising the intra- or inter-frame residual samples and any motion vector in the case of inter-frame encoding. This will include encoded samples for both the image region 24 and the border region 26. In embodiments, the frame size of the encoder 6 may be settable parameter of the encoder 6, e.g. this is allowed by the H.264 and HEVC standards. In this case, the frame size of the encoder 6 may also be signalled to the decoder 10 in side information 22 embedded in the encoded bitstream 8. The pre-processing module 4 also outputs an indication 18 of the downscaling or resizing that is applied to generate the resized image portion 24, and this indication is transmitted to the renderer 12 at the decode side. This resizing information 18 may be signalled in side information 22 embedded in the encoded bitstream 8 or alternatively may be signalled at a higher level or by an alternative channel, e.g. may be signalled on a protocol level of the transmitting client application conducting the video call. Note that in embodiments, the frame size of the encoder 6 remains constant over multiple frames while the size of the image region 24 in the modified frames F' is adapted. Hence the frame size of the encoder 6 may be considered a parameter of the system, while the size of the image region 24 in the modified frames maybe considered a variable.

The decoder 10 at the decode side is arranged to receive the encoded bitstream 8 via the channel established over the network or other medium, and to decode the encoded samples 20 of each of the modified frames F'. Similarly to the encoder 6, the decoder 10 does not have to have any special knowledge of the resizing applied to generate the image region 24 or of the border region 26 and does not necessarily need to be any special kind of decoder. In embodiments, the decoder 10 may be a standard decoder such as in accordance with H.264 or HEVC, or could even be a hardware decoder. The decoder 10 just decodes the modified frames F' as if they were any other frames, e.g. any frame that happens to have dark or static edge regions. This will comprise applying the inverse of whatever encoding mode the encoder 6 applied to each block of the encoded modified frame, which may comprise intra- or inter-frame prediction of blocks in the image region 24 and border region 26. The decoder 10 decodes each of the modified frames at the frame size at which they were encoded by the encoder 6, e.g. as indicated as a parameter of the encoder 6 in the side information 22.

The decoder 10 outputs each of the decoded versions of the modified frames F' to the renderer 12. The renderer 12 is arranged to render each of the decoded frames and output them to be played out on the screen 16. To do this, in accordance with embodiments of the present disclosure, the renderer 12 comprises a resizing stage 14. The resizing stage 14 is configured to receive the resizing information 18 from the encode side, and to scale up the downsized image 24 back up to the frame size of the encoder 6, and to discard the border region 26. The resizing stage 14 thus generates an output frame for output to the screen 16 having the same frame size as would be expected from the encoder 6. In embodiments, this may also be the same size as the source frames F.

Note that in embodiments, even if the decoder side is not equipped with a resizing stage 14, the received modified frames F' are still usable at the decode side. For example, if the border region 26 is generated as a black or otherwise uniform border, a conventional decoder 10 and renderer 12 will simply decode and render a video image comprising a reduced size image region 24 and the border 26. Such an image will still be meaningful to the receiving user, and will just appear on screen with a relatively unobtrusive border. In further embodiments, even if a scaling up is to be applied at the decode side, it is not essential to transmit the resizing information 18. For example, in an alternative embodiment, the user at the decode side could manually zoom in on the image region 24 to the exclusion of some or all of the border region 26. Nonetheless, some embodiments can transmit the resizing information, as a manual zoom is likely to be less desirable in terms of user experience.

Figure 4:
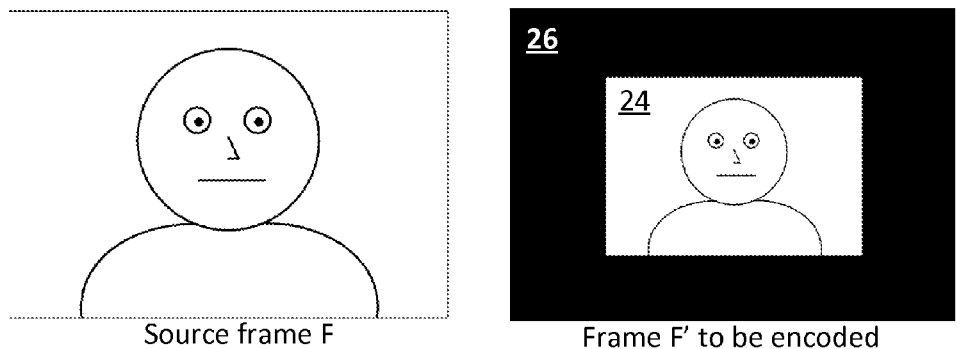
FIG. 4 is a schematic representation of a source frame and a corresponding modified frame produced from the source frame.

FIG. 4 shows one example of the pre-processing operation that may be applied by the pre-processing stage 4. For each a plurality of source frames F provided from the camera 2 to the pre-processing stage 4, the pre-processing stage 4 downscales the image of the source frame F to produce a corresponding image region 24 which is smaller than the frame size of the encoder 6. The pre-processing stage 4 then adds, around the downscaled image region 24, a border region 26 which on average will incur fewer bits when encoded by the encoder 6 than if the image of the source frame F was encoded taking up the full frame size of the encoder 6. The downscaled image region 24 and border region 26 together form a modified frame F' corresponding to the respective source frame F, which will be output from the pre-processing stage 4 to the encoder 6 to be encoded and then transmitted in the encoded bitstream 8. If the border region 26 takes fewer bits to encode, this means it will incur a lower bit rate in the encoded bitstream 8, and in many cases also less processing resource to encode at the first, transmitting user terminal and less processing resource to decode at the second, receiving user terminal.

To achieve this property of the border region 26, there are a number of options. As will be familiar with a person skilled on the art, an effect of an encoder using prediction coding is that regions of data in a frame incur fewer bits to encode when there are fewer differences across the frame (in the case of intra-frame encoding) and fewer differences between frames (in the case of inter-frame encoding). Hence in embodiments, the border region 26 may be generated so as to be a solid region of a single colour, i.e. to be uniform in all colour space values (including any brightness channel) across the whole border region. For example, the border region 26 may be solid black (all zeros in most colour space representations). Alternatively, or additionally, the border region 26 may remain constant in shape, size and/or colour space values over a plurality of consecutive frames. For example, the border region 26 may stay black over multiple consecutive frames. Other solid colours may alternatively be used, although in embodiments, black may be used so that if the decoder side is not equipped to scale the image region 24 back up and discard the border 26 and instead displays the modified frame F' in its modified form, then the black border 26 will still appear relatively unobtrusive in appearance from the perspective of the receiving user. In yet another alternative, the border is not necessarily black or uniform within a given frame. If the border 26 will not be displayed at the far end, in embodiments, it may be beneficial to put into the border area whatever data costs the fewest bits. For example, in case of panning motion where the same motion vector is coded for the whole frame, prediction will result in image data from the previous frame in parts of the "black border"—unless additional bits are spent to make it black.

Whatever border region 26 is used, in embodiments the pre-processing stage 4 is also configured to output an indication 18 of the resizing that has been applied to the source frame F to produce the resized image region 24. In the case of a downscaling, as illustrated in FIG. 4, this indication 18 may for example comprise an indication of the percentage or fraction scaling applied to the horizontal and vertical axes of the image, or the overall percentage or fraction scaling applied to the area of the image. The indication 18 could explicitly signal the degree of downscaling, or could indicate one or a plurality of predetermined downscalings which are also understood by the decoder side. The indication 18 may also indicate the location of the scaled down region 24 in the modified frame F', e.g. in terms of pixel coordinates (or alternatively this could be predetermined at the encoder and decode sides, e.g. assuming it's always in the centre of the frame).

The indication of the downscaling 18 is transmitted from the first, transmitting user terminal to the resizing stage 14 of the renderer 12 on the second, receiving user terminal. As mentioned, this may be transmitted in side information 22 in the encoded bitstream 8 (e.g. as an additional element along with an indication of the frame size of the encoder 6), or alternatively may be signalled via another layer or channel such as the control protocol layer of the video communication client application (e.g. VoIP application) running on the first, transmitting user terminal and conducting the call with the second, receiving user terminal. The resizing stage 14 on the decode side renderer 12 is configured to use this indication to scale the image region 24 back up to the full frame size of the encoder 6 following the decoding by the decoder 10, so that the border region 26 no longer takes up any of the frame area in the frames output by the renderer 12 to the screen 16.

Figure 5:
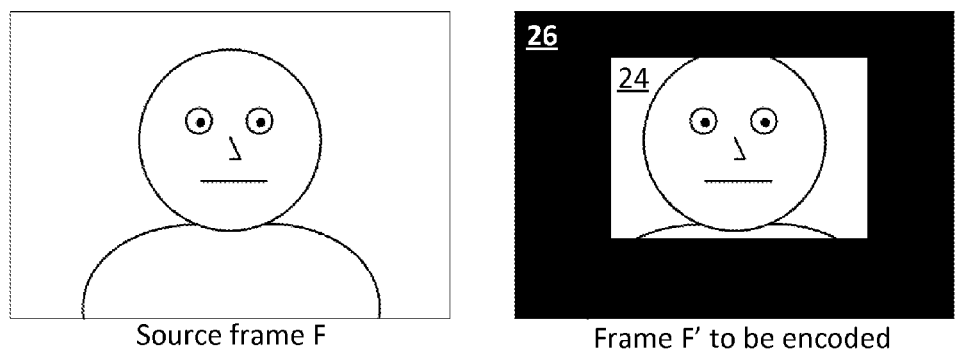
FIG. 5 is another schematic representation of a source frame and a corresponding modified frame produced from the source frame.

FIG. 5 illustrates another example of a pre-processing operation that may be applied by the pre-processing stage 4. In this example, the pre-processing stage does not necessarily scale down the image from the source frame F but rather crops the source frame F to cut away areas of background from one or more edges of the frame. The cropped areas are then replaced by the border region 26, which may be given similar properties to those discussed above. In such embodiments, the remaining image region 24 may be referred to as a region of interest (ROI). There are a number of possibilities for defining or determining the region of interest 24. In one embodiment, the region of interest 24 may be determined automatically by a facial recognition algorithm applied at the encoder side terminal in order to recognise a face of the sending user in the source frame F. The pre-processing stage 4 may thus be configured to automatically crop the source frame F to retain all but a certain ROI 24 around the facial region of the user. Alternatively the ROI 24 could be selected manually by a user at the transmitting side, or by a user at the receiving side and fed back as a request to the transmit side. In another alternative, the ROI 24 may be a fixed, predefined region within the frame area. For example, in the case of a typical "talking head" video call, it may be assumed that the user's face usually appears around the same region within the frame area, and this may be predefined as the ROI.

In embodiments, the pre-processing stage 4 outputs an indication of the ROI to be transmitted to the resizing stage 14 of the decoder side renderer 12 to be used by the resizing stage 14 to scale the image region 24 back up to the full frame size of the encoder 6 for output to screen 16 at the decoder side. This indication of the ROI 18 may comprise an indication of the size and/or position of the cropped region 24, or an indication of one of a predetermined set of cropping operations which the resizing stage 14 is also pre-configured to recognise. Again, the indication 18 may be transmitted in the side information 22 of the encoded bitstream 8 or via an alternative channel or protocol layer. Alternatively in the case of a predefined ROI, the resizing stage 14 may also be preconfigured with knowledge of this predefined ROI and therefore it need not be signalled.

Note that the options of downscaling (e.g. as in FIG. 4) and cropping (e.g. as in FIG. 5) may be used alone or in combination. For example, in embodiments, the pre-processing stage 4 may apply a cropping to exclude some background parts of the source frame F, and then further apply a downscaling to the remaining part of the source frame F to produce the downsized image region 24 to be included in the modified frame F' for encoding by the encoder 6.

The above provides examples of a mechanism by which the effective resolution of a video image being encoded and transmitted can be controlled independently of the actual frame size of the encoder 6. This in itself may have various useful applications. For example, if given an encoder 6 having a fixed frame size that is larger than desired for a current design, the designer may place a pre-processing stage 4 at the input of the encoder in order to change the effective resolution. Furthermore, in embodiments, the pre-processing stage 4 may be configured to dynamically adapt the effective resolution in response to one or more conditions experienced over the channel between the encoder side and the decoder side and/or one or more processing resources of the encoder side or decoder side user terminals. This may be used as an alternative to or in addition to adapting the actual frame size of the encoder 6 (if allowed by the encoder 6). In either case, the frame size of the encoder 6 can remain constant over a plurality of consecutive frames while the effective resolution (i.e. the size of the downsized image region 24) is adapted. If the frame size of the encoder 6 can also be adapted, this may be used to effect large jumps in the resolution while the adaptation of the image region 24 is used to effect smaller gradations between these frame sizes.

Figure 6:
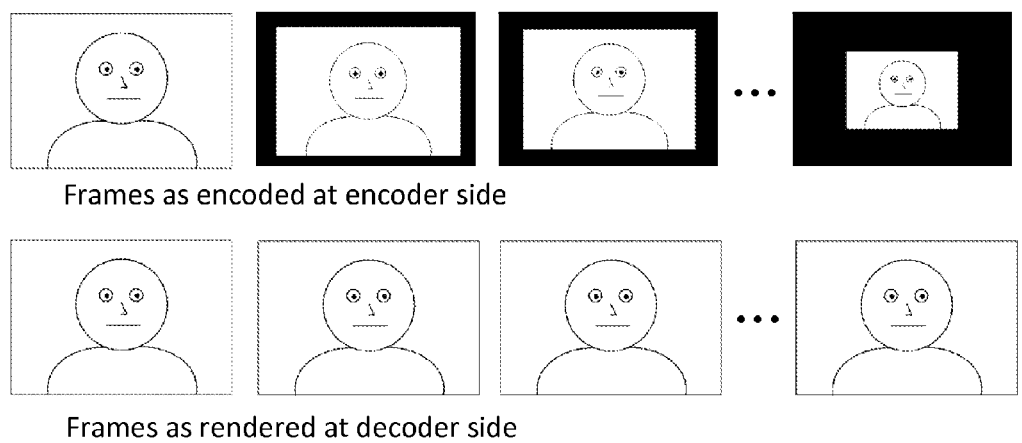
FIG. 6 is a schematic representation of a sequence of encoded frames including modified frames, and a corresponding sequence of frames as rendered at the decode side.

An example is illustrated in FIG. 6. It may be the case that the encoder 6 has a fixed resolution (frame size) or is only configured with a small set of discrete resolutions which may be spaced apart in large resolution steps. Even if the encoder 6 can be set to use any arbitrary resolution, there may be a penalty associated with this such as having to transmit a new intra-frame (key frame) every time the resolution is adapted, thus incurring a relatively large number of bits in the encoded bitstream 8. Hence, it may be desirable to adapt the resolution by alternative means, which according to embodiments disclosed herein may be achieved by adapting the effective resolution (size of the downsized image region 24).

The pre-processing stage 4 may be configured to monitor one or more current properties of the channel between the encoder 6 on the first, transmitting user terminal and the decoder 10 on the second, receiving user terminal. The monitored properties may comprise one or more of: an uplink bandwidth from the first terminal, a bandwidth of a network or other medium over which the channel is established, a downlink bandwidth of the second terminal, an overall bandwidth of the channel, a loss rate such as packet loss, an error rate, delay, jitter or any other property which may affect the transmission of the encoded bitstream 8. Alternatively or additionally, the pre-processing stage 4 may be configured to monitor one or more processing resources of the first user terminal upon which the encoder 6 is running. These properties may comprise one or more of: an availability of processing cycles and/or an availability of one or more storage resources such as registers, cache or RAM. Alternatively or additionally the pre-processing stage 4 may be configured to monitor a feedback from the decoder side of one or more processing resources of the second terminal on which the decoder 10 is running Again these properties may comprise one or more of: available processing cycles at the second terminal and/or the availability of one or more storage resources. In embodiments the pre-processing module 4 may also be configured to predict how any such properties may change based on the monitoring.

Based on any one or more of these monitored and/or predicted properties, the pre-processing stage 4 is configured to dynamically adapt the downsizing applied to the source frame F and therefore the size of the resulting image region 24 in the modified frame F' to be encoded by the encoder 6. Thus the pre-processing stage 4 is able to dynamically adapt the effective resolution of the transmitted video independently of the frame size of the encoder 6, and without necessarily having to adapt the frame size of the encoder 6, at least for a duration while the image region 24 is adapted. To dynamically adapt means to adapt during on going encoding by the encoder 6 in response to ongoing changes in one or more of the monitored conditions, whether channel conditions and/or processing resources. E.g. the pre-processing stage 4 is configured so that if it detects or predicts a reduction in available bandwidth over the channel or a reduction in available processing resource at the transmitting terminal, it may reduce the size of the image portion 24 in the encode frame set F' in order to accommodate in the reduced capability of the channel and/or terminal. Similarly, if it detects or predicts an increase in one or more such properties, it may increase the size of the image region 24.

In embodiments, the pre-processing stage 4 is also configured to adapt to the size of the image region 24 smoothly in relatively finely gradated steps. If the frame size of the encoder 6 can also be adapted, the steps applied to the image region 24 are can be small relative to the steps in the frame sizes between which the encoder 6 is switched. For example, the encoder 6 may be configured to switch between the 720p format and the VGA format, while the pre-processing stage 4 provides gradated steps between the resolutions of these formats. In embodiments, the steps in the size of the image region 24 may be less than or equal to 10% by width and height of the difference between any two of the discrete set of frame sizes used by the encoder 6. For example, the pre-processing stage 4 may adapt the size of the image region 24 in 5% steps by width and height.

Each step in the size of the image region 24 may be applied after the pre-processing stage 4 performs a respective monitoring operation and determines that the size is to be adapted. The pre-processing stage 4 may be configured such that there is a certain time limit or delay between the monitoring operations and therefore between the opportunities to increment or decrement the size of the image region 24 by a step (whether this is a deliberate or predetermined delay or just the naturally elapsed between monitoring operations due to the processing speed of the transmitting user terminal and other operations scheduled to processed). In embodiments, the pre-processing stage 4 may be configured to periodically perform a determination as to whether to increment or decrement the image region 24 or leave it be, incrementing or decrementing the size by no more than one step per period. The pre-processing stage 4 may be configured to perform the determination and apply no more than one increment or decrement per predetermined number of frames, e.g. no more than once per frame. Thus the effective resolution provided by the image region 24 may be adapted relatively smoothly in relatively fine grained steps.

In the example of FIG. 6, the pre-processing of stage 4 is gradually decreasing the size of the image region 24 over a plurality of consecutive frames while the frame size of the encoder 6 remains constant. For example, the size of the image region 24 may be decremented by one step per frame in response to determining that the bandwidth of the channel is too low to support a full size image. At the decode side, after having been scaled back up by the resizing stage 14, each of these frames is displayed at the same pixel resolution defined by the frame size of the encoder 6, albeit appearing coarser in those frames that have been resized.

Note that at other times the pre-processing stage 4 does not necessarily apply any resizing to the source frame F such that the image region 24 in the frame being encoded takes up the full frame size of the encoder 6 and there is no border region 26. Generally, the pre-processing stage 4 may operate by switching between a state in which no downsizing is applied and the image region 24 takes up the full frame size of the encoder and a state in which it does downsize a source frame to produce an image region 24 smaller than the frame size of the encoder 6 combined with a border region 26, and/or the pre-processing stage 4 may adapt between multiple different sizes of image region 24 that are smaller than the frame size of the encoder 6.

In yet further embodiments, the border region 26 is exploited to embed other non-image data or at least "non-render" data to be transmitted to the second, receiving user terminal Such data does not encode an image, or at least does not in itself represent an image to be rendered at the decode side (but may be used to compress future frames). For example, such data could comprise information on motion of the camera 2, e.g. obtained from accelerometers of the first, transmitting terminal, and this information could be used to aid in the decoding at the decoder side 10. As another example, other data unrelated to the decoding could be embedded in the border region 26, e.g. a text based messages to be displayed to the user of the receiving terminal.

To embed any such data, it could be included in any unused fields of side information associated with blocks of the border region 26. Alternatively or additionally, a small number of the pixel values in the border region 26 may be used to represent such other, non-image data. For example in the case of a black border (all zeros in most colour space representations), a small number of pixels may actually be modulated between two more small values on one or more of the colour space channels. For example, the brightness channel could be modulated between zero and one, if the colour space channels can take a value e.g. between zero and 255, this small modulation will incur hardly any extra bits to be encoded and will be more or less interceptable to the receiving user even if the border region 26 is displayed. Thus the border region 26 can be kept substantially uniform and/or constant if required.

It will be appreciated that the above embodiments have been described only by way of example.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the terminals may include an entity (e.g. software) that causes hardware of the user terminals to perform operations, e.g., processors functional blocks, and so on. For example, the terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal for participating in video calls, comprising:
   an encoder having a frame size, the frame size being a size in pixels at which the encoder encodes frames of video; and
   a pre-processing stage configured to supply a sequence of frames to the encoder at said frame size, each frame comprising at least an image region representing a source video image at a respective moment in time;
   wherein the pre-processing stage is configured to supply at least some of said frames to the encoder in a modified form, by resizing the source video image to produce the image region of each modified frame with a size smaller than the frame size of the encoder, and combining with a border region such that the modified frame matches the frame size of the encoder, the resizing comprising cropping a portion of the source video image and replacing the cropped portion of the source video image with a portion of the border region; and
   wherein the encoder is arranged to encode each of the frames at said frame size, and to transmit the encoded frames to a receiving terminal as part of a live video call.

2. The user terminal of claim 1, wherein the pre-processing stage is configured to dynamically change the size of the image region in dependence on one or more channel conditions affecting said transmission, one or more processing resources of said user terminal, and/or one or more processing resources of the receiving terminal; and to adapt the border region so that each frame retains the frame size of the encoder.

3. The user terminal of claim 2, wherein said adaptation change comprises varying the size of the image region between a plurality of different sizes smaller than the frame size of the encoder.

4. The user terminal of claim 3, wherein said change comprises varying the size of the image region between the frame size of the encoder and at least one size smaller than the frame size of the encoder.

5. The user terminal of claim 2, wherein the frame size of the encoder remains constant over a consecutive plurality of said frames while the size of the image region is changed.

6. The user terminal of claim 5, wherein the encoder is operable to switch between different ones of a set of predetermined frame sizes.

7. The user terminal of claim 6, wherein the encoder is configured to dynamically switch between different ones of the predetermined frame sizes, in dependence on one or more channel conditions affecting said transmission, one or more processing resources of said user terminal, and/or one or more processing resources of the receiving terminal.

8. The user terminal of claim 6, wherein said change comprises varying the size of the image region in steps having a finer granularity than said predetermined frame sizes.

9. The user terminal of claim 1, wherein the pre-processing stage is configured to perform said resizing by scaling down the source video image.

10. The user terminal of claim 1, wherein the pre-processing stage is configured to embed alternative data in the border region which does not represent an image to be rendered at the receiving terminal.

11. The user terminal of claim 1, wherein the border region has uniform colour and brightness within each of the modified frames, other than any modulation embedding non-image data.

12. The user terminal of claim 1, wherein the border region is black.

13. The user terminal of claim 1, wherein the border region remains constant over a plurality of the modified frames, other than any modulation embedding non-image data.

14. The user terminal of claim 1, wherein the border region comprises no image content beyond that of the video image.

15. The user terminal of claim 1, wherein the encoding of the border region comprises inter or intra frame prediction coding.

16. The user terminal of claim 1, configured to signal information on said resizing to the receiving terminal, for use in scaling up the image region of the modified frames for display by the receiving terminal.

17. The user terminal of claim 16, wherein the information on the resizing comprises one or more of: an indication of a percentage or fraction scaling, and/or a position of the image region within the modified frame.

18. A video telephony system comprising the user terminal of claim 16 and the receiving terminal, the receiving terminal comprising:
- a decoder configured to decode each of the frames; and
- a renderer configured to render the image portion of each decoded frame at said frame size;
- wherein the renderer comprises a resizing stage configured to receive the information on the resizing performed by the pre-processing stage, and based on said information to scale up the image portion of each of the modified frames to said frame size, discarding the border region.

19. A user terminal for participating in video calls, comprising:
- a decoder configured to receive and decode a sequence of frames from an encoder of a transmitting terminal, each frame having been encoded at a frame size of the encoder being a size in pixels and remaining constant while the resolution of the frames changes, and each frame comprising at least an image portion representing a source video image at a respective moment in time; and
- a renderer configured to render the image portion of each decoded frame at the frame size of the encoder;
- wherein at least some of the frames have been modified prior to encoding by the encoder, whereby the image region has been resized from the source video image to a size smaller than the frame size of the encoder, and combined with a border region such that the modified frame matches the frame size of the encoder; and
- wherein the renderer comprises a resizing stage configured to receive information on the resizing, and based on said information to scale up the image portion of each of the modified frames to the frame size of the encoder, discarding the border region.

20. A computer-implemented method comprising:
- supplying a sequence of outbound frames to a near-end encoder at a frame size of the near-end encoder, the frame size being a size in pixels at which the near-end encoder encodes frames of video, and each outbound frame comprising at least an image region representing a source video image at a respective moment in time; and
- supplying at least some of said outbound frames to the near-end encoder in a modified form, by resizing the source video image to produce the image region of each modified frame with a size smaller than the frame size of the near-end encoder, and combining with a border region such that the modified frame matches the frame size of the near-end encoder, the resizing comprising cropping a portion of the source video image and replacing the cropped portion of the source video image with a portion of the border region;
- encoding each of the frames at said frame size for transmission to a receiving terminal.

* * * * *